Dec. 29, 1964   J. N. IANUZZI ETAL   3,162,935
CAPPING MECHANISM
Filed Dec. 4, 1961   4 Sheets-Sheet 1
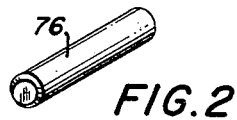
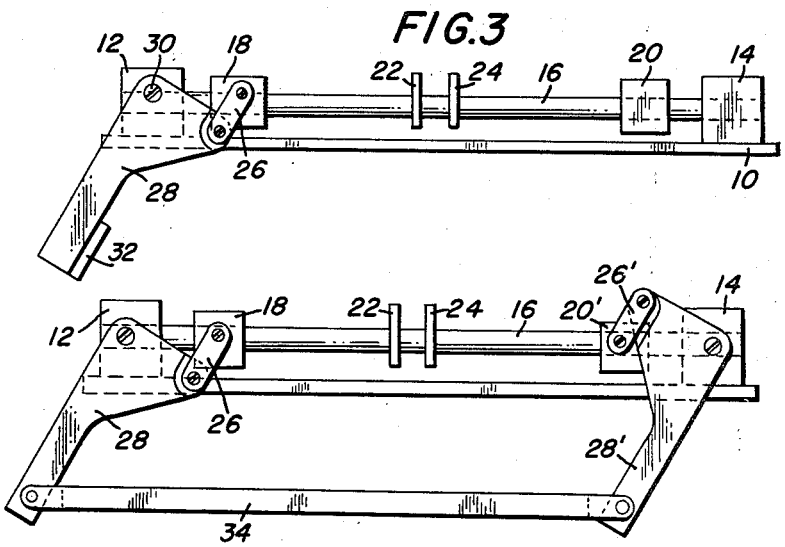
INVENTOR
JOSEPH N. IANUZZI
AND ERNEST J. BRYNER
BY  *Hall & Houston*
ATTORNEYS

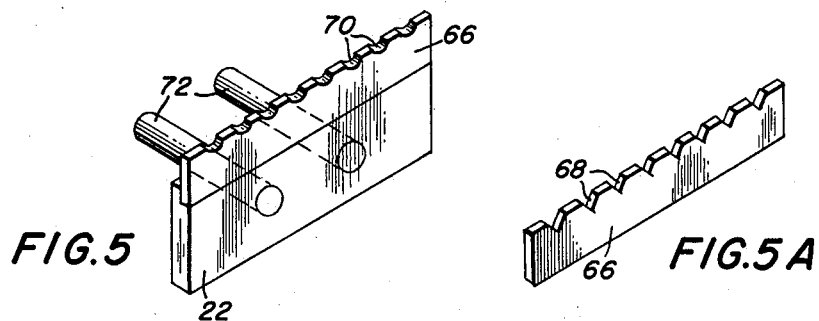
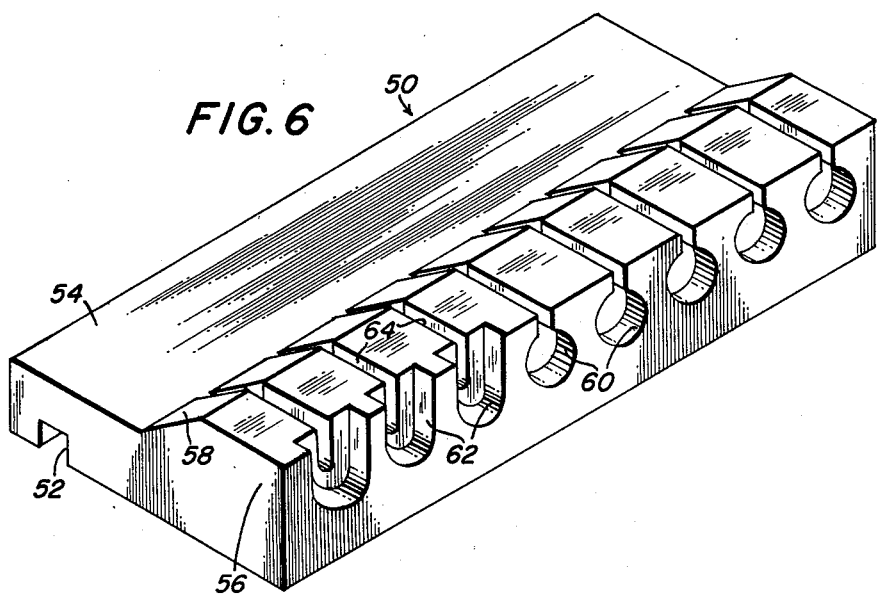

Dec. 29, 1964    J. N. IANUZZI ETAL    3,162,935
CAPPING MECHANISM
Filed Dec. 4, 1961    4 Sheets-Sheet 3

INVENTOR
JOSEPH N. IANUZZI
AND ERNEST J. BRYNER

BY
ATTORNEYS

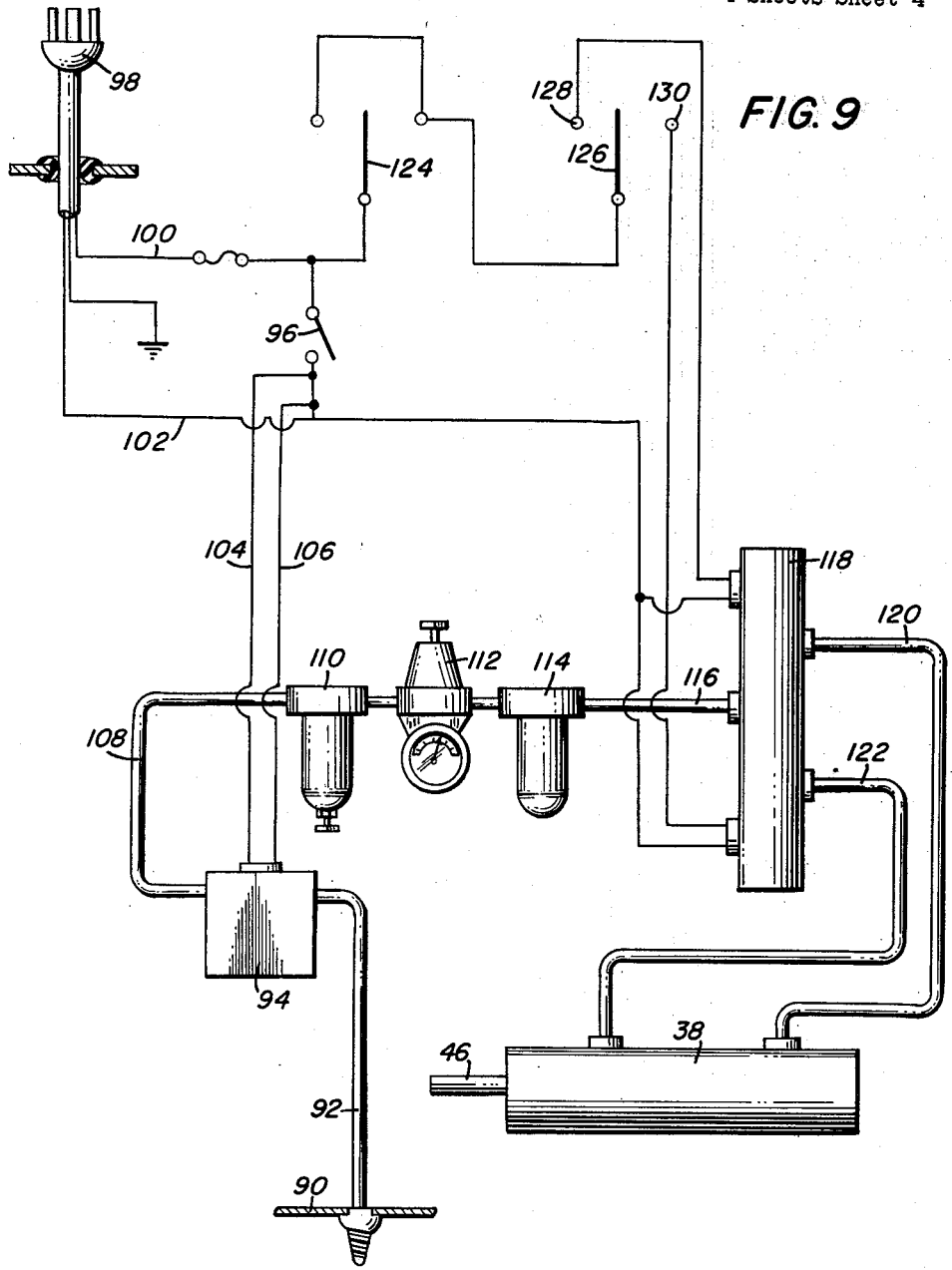

United States Patent Office 3,162,935
Patented Dec. 29, 1964

3,162,935
CAPPING MECHANISM
Joseph N. Ianuzzi, Bradford, and Ernest J. Bryner, Custer City, Pa., assignors to Sigma Engineering Service, Inc., Custer City, Pa., a corporation of Pennsylvania
Filed Dec. 4, 1961, Ser. No. 156,650
17 Claims. (Cl. 29—203)

The present invention relates generally to machines for capping elongate elements, and more particularly to such a machine for applying caps simultaneously to the ends of elongate bodies, such as for example, electrical condensers and resisters.

In the past, machines for performing this function have applied caps to the elongate bodies one at a time, i.e. one cap is applied to one end of a body and then the other cap is applied thereto. Also, only one of these bodies was capped during each cycle of operation. Furthermore, much of the operation, prior to the actual capping operation itself, had to be performed manually. For example, in some instances the caps were manually placed on the bodies, and then a press was used for securing them in place. Therefore, a great deal of time was wasted and adverse affects upon standardization of parts was not at all unusual. These prior devices were difficult or awkward to use and a problem was encountered each time bodies were to be inserted into or removed from the device. For example, one of these devices uses a clothespin like element for clamping a single body to the apparatus. Therefore, a relatively great amount of time was required for setting up the machine before the capping operation could be performed, and an equal length of time was needed to remove the bodies, together with their clamps, from the machine. Since there was no provision in these machines for stripping the caps from the dies, these caps would sometimes remain engaged in the dies, and after the capping operation the machine would jam, or the elongate body was apt to be damaged due to the fact that the cap was being held in its die while the elongate body was being clamped to the machine.

With these defects of the prior art in mind, it is the primary object of this invention to provide a body capping machine which may cap both ends of a plurality of bodies simultaneously.

Another object of this invention is to provide a machine of the type described which is extremely easy to load and unload, that is to insert elongate bodies thereinto and to remove the capped bodies therefrom.

A further object of the invention is to provide a capping device wherein the capped bodies may be stripped relatively easily from the dies so that the possibility of jamming the machine or of damaging the capped bodies is virtually eliminated.

Still a further object of the invention is to provide a capping device which is so constructed that it may be readily incorporated into an assembly line and may be used in production assembly lines with a great saving of time and motion.

These objects and others ancillary thereto are accomplished according to preferred embodiments of the invention, wherein a machine is provided having a pair of blocks in which a pair of spaced, parallel guide rails are mounted. A die holding block is mounted on these rails at each end thereof, with one of them designed for axial movement, and the other designed to be normally stationary, although axial movement thereof may take place. A pair of body supporting bars are mounted between the two die holders on body bar holders which are also axially movable along the rails.

A pair of back-up screws are provided in the block, adjacent the normally stationary die holder, so as to determine the extreme axial movement of the die holder which may take place before the movement thereof is abruptly prevented by the screws. If desired, a similar screw may be provided in the other block for limiting the retracting movement of the normally movable die holder.

Each die holder has a one-piece, multiple cavity die mounted thereon, in which the cavities or cap nests face inwardly toward each other. These dies are split from above, so that caps having projecting leads may be inserted into these cavities, the cavity proper accommodating the cap proper, while the lead projecting therefrom may extend through the slot. With such a construction the caps may be inserted from above.

A linkage is provided for driving the movable die axially toward the body supporting bars and the stationary die. This linkage may be actuated by means of a pneumatic motor in the form of a piston and cylinder arrangement. Although, normally only one of the die holders will be driven, the device may easily be arranged to have both die holders driven whereby the capping operation rather than taking place at the end of the device near the normally stationary die holder, will take place in the middle of the press.

The controls for this device are provided by a four way valve which connects a source of compressed air with the double acting cylinder. This valve is controlled electrically and may only be operated when two spaced switches are actuated, so that the operator must have one hand on each switch. Therefore, a safety measure is provided since the operator thus can not injure his hands during operation of the device.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURES 1, 1A, 1B, 1C and 1D are perspective views of a number of different caps, with projecting leads, which may be used in connection with the present invention;

FIGURES 2 and 2A are perspective views of two types of elongate bodies which may be used with the present invention and onto which the caps are to be applied;

FIGURE 3 is an elevational side view of one embodiment of the present invention wherein only one of the die holders is driven and wherein some elements are omitted for purposes of clarity;

FIGURE 4 is an elevational view similar to FIGURE 3, but illustrating another embodiment wherein both die holders are positively driven;

FIGURES 5 and 5A are perspective views of the body supporting bars, one of them being illustrated per se, and the other being illustrated as being mounted upon a body holding member associated with guide rails;

FIGURE 6 is a perspective view of a multiple cavity die which comprises part of the present invention;

FIGURE 9 is a schematic view of the control and drive arrangement for the present invention.

Figure 7:
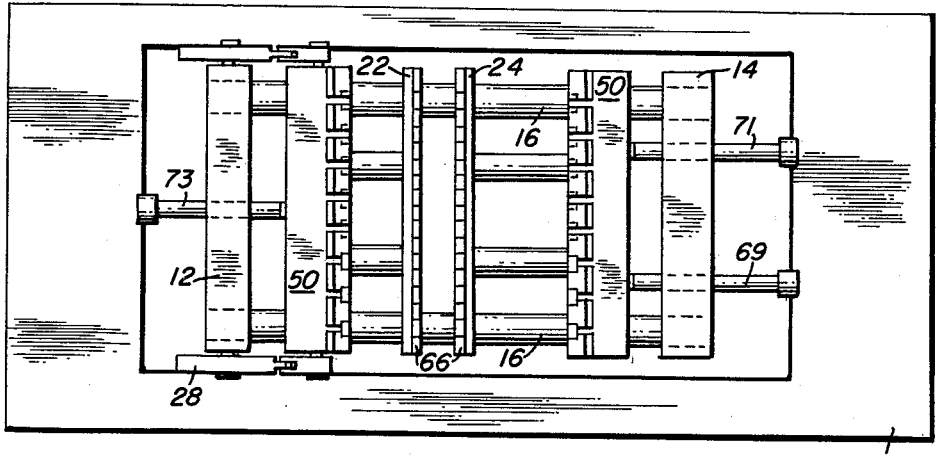
FIGURE 7 is a plan view of the present invention mounted upon a table.

With more particular reference to the drawings, FIGURE 3 illustrates one embodiment of the present invention. In this embodiment the baseplate 10 of a frame or table is provided, onto which a pair of support blocks 12 and 14 are mounted at each end thereof. A pair of guide rails 16 are mounted in support blocks 12 and 14 and are disposed spaced from, but parallel to, each other.

A pair of die holdng blocks 18 and 20 are mounted for axial movement along these guide rails. A pair of body holders 22 and 24, which may be connected with each other in any suitable manner, are also mounted for axial movement along guide rails 16.

A lever 26 is pivotally connected at one end to die holder 18, and is pivotally connected at its other end with a bell-crank lever 28 which itself is pivotally mounted at 30 on support block 12. This lever 28 is provided with a reinforcing surface 32 to which any suitable drive means may be connected. Thus, by moving bell-crank lever 28 counterclockwise as viewed in FIGURE 3, the lever 26 moves toward a horizontal position, and die holder 18 would be moved toward body holders 22 and 24. Holder 18 will eventually engage these bars and slide them toward die holder 20, at which point the pressing operation will take place, it being understood that the elongate bodies are held in bars mounted on holders 22 and 24, and that the caps to be applied to the ends thereof are held in dies which are to be mounted on die holders 18 and 20.

Another embodiment of the invention is illustrated in FIGURE 4 wherein the die holders are indicated as 18 and 20', both of these being movable along guide rails 16. Levers 26 and 26' are connected to the holders 18 and 20', respectively, and these levers in turn are pivotally mounted to bell-crank levers 28 and 28'.

The projecting ends of the bell-crank levers are both pivotally connected to a connection bar 34. Thus, if bar 34 is moved toward the right as viewed in FIGURE 4, bell-crank lever 28 will pivot counterclockwise as will lever 28'. However, since the levers are connected in a slightly different manner at each end, levers 26 and 26' will both be moved toward a horizontal position and the die holders 18 and 20' will move inwardly toward each other and thereby complete the pressing operation. The machine is thus generally in the form of a horizontal toggle press. Since these two embodiments are generally equivalent and the duplex movement arrangement is only required infrequently for special parts, the remainder of the specification will be mostly concerned with the single block motion arrangement illustrated in FIGURE 3. The description will also apply to FIGURE 4, with only minor and readily recognizable differences.

Figure 8:
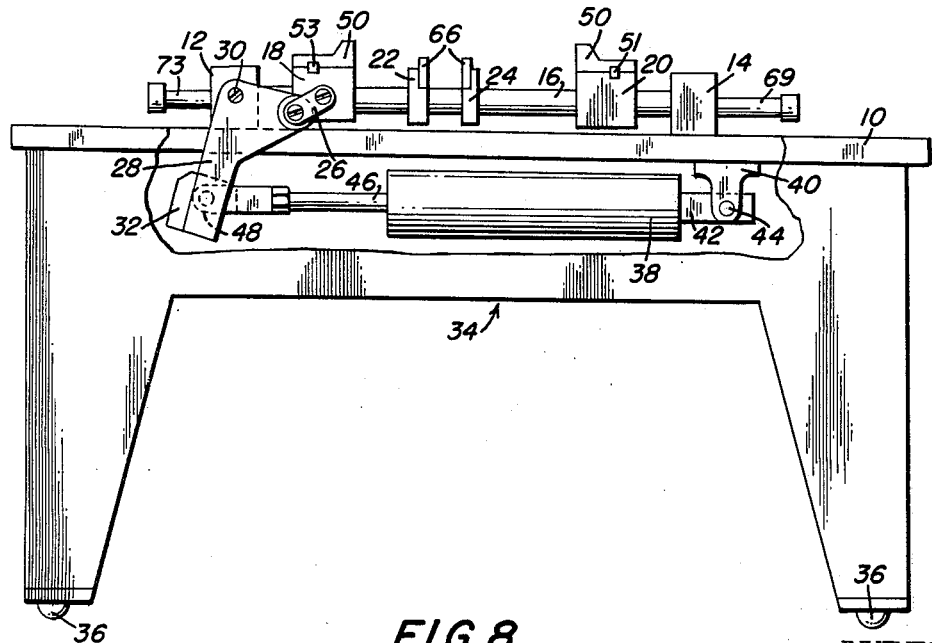
FIGURE 8 is an elevational side view of the device illustrated in FIGURE 7 with a portion thereof broken away for purposes of clarity.

With more particular reference now to FIGURE 8, the device is mounted upon a table which may be placed into a production or assembly line. The table 34 may preferably be mounted on casters 36 so that it may be easily moved from place to place. The baseplate 10 of the device is the table surface, and the support blocks 12 and 14 are mounted thereto by any suitable means, such as by large bolts and nuts.

The drive for the device is provided by a pneumatic cylinder 38 which is mounted to a pair of ears 40 in turn connected to the lower surface of table 10. A projecting leg 42 on the cylinder is pivotally connected at 44 between ears 40. A piston rod 46 projects from cylinder 38 and is pivotally connected at 48 to the reinforced portion 32 of bell-crank lever 28. Thus, when the piston rod 46 is retracted into cylinder 38, bell-crank lever 28 is moved counterclockwise about its pivot 30 and thus lever 26 moves toward a horizontal position whereby die holder 18 moves toward the right as viewed in FIGURE 8.

A one piece, multiple cavity die generally indicated at 50 and shown in detail in FIGURE 6 is mounted onto each die holder 18 and 20. It is provided in its lower surface with a keyway 52 by means of which it may be locked to the die holder. For this purpose, the die holders 18 and 20 each have similar keyways 51 in the supper surfaces thereof. These keyways are disposed so that when they accommodate an ilngment bar 53, the lateral surfaces of the dies and the die holders will be aligned. Once this alignment is achieved the dies may be detachably mounted to the die holders with pins or the like in any suitable manner. Thus, the dies are interchangeable.

Each of the dies comprises a generally rectangular rear section 54 and a thickened forward portion 56 having inclined surfaces 58 extending between said portions. A plurality of cap nests or cavities 60 are formed in the side surface of the die, and are generally circular in nature. If desired and as shown in FIGURE 6, these cavities may also be of the type shown at 62 where they are generally U shaped cavities. These latter provide for easier insertion of the caps into the die since the caps may be inserted from the top, in contrast to cavities 60 where the caps must be inserted from the side of the die. Each of the cavities or nests is provided with slots 64, parallel to the axes of the cavities 60 or 62, and which extend through the thickened or reinforced portion 56 downwardly to about the center of the circular or generally circular cavities.

The body supporting bars 66, which are mounted upon the body holders 22 and 24, are illustrated more particularly in FIGURE 5. They have notches 68 or 70 formed therein which are V-shaped and semi-circular respectively. The bodies may be easily inserted onto the body supporting bars from the top, and thus insertion of the bodies into the device and removal therefrom is a relatively simple task. A pair of guide bars 72 may be mounted on the body bar holders 22 and 24 to rigidly connect the holders together. In such event, these bars 72 will project into die holders 18 and 20 through which they move relatively easily due to ball or roller bearings.

Thus, elongate bodies such as the film type resisters illustrated in FIGURES 2 and 2A and indicated at 74 as the straight cylindrical type, and at 76 of the chamfered type may be carried by bars 66. As illustrated in FIGURES 1, 1A, 1B, 1C and 1D, various types of caps may be used, each of which has leads projecting therefrom as indicated at 78, 80, 82, 84, and 86. It should be noted that although all of these caps are illustrated as having projecting leads 88, caps of the type without leads may also be utilized.

The operation of this device will now be described in connection with FIGURE 8, in particular. The caps with the projecting leads 88 are inserted into dies 50, with the projecting leads 88 being disposed in slots 64 and the heads of the caps disposed in the die cavities. Thus the dies on each side of the machine, that is the dies held by die holders 18 and 20, will be loaded. Next, the body holder bars for holding bodies 74 or 76, which we will assume to be film resisters, will be placed onto the two sets of bars 66 in the central portion of the machine, whereby the bodies are loosely supported on these bars, it being noted that the body supporting bars are freely slidable along guide rails 16. Then, cylinder 38 is actuated to retract piston 46 and die holder 18 will move toward the right carrying with it the body bar holders 22 and 24. Together, they will eventually come into contact with die holder 20, at which point die holder 20 will no longer move toward the right and, since the slots 68 or 70 of the body bars are each in alignment with a cavity of the dies, each of the bodies will have the caps, which are loaded into the dies, pressed onto both ends of the bodies simultaneously. This will occur in all of the bodies which are disposed in the slots 68 or 70.

The movement of die holder 20 toward the right is adjustably limited by back-up screws 69 and 71 which are threadedly engaged in support block 14 and which are axially adjustable upon rotational movement. If desired a similar back-up screw 73 may be provided in support block 12 to limit the movement of movable die holder 18 to the left.

Since the caps are designed to have a negative tolerance, they will be a press fit or an interference fit on the film resisters 74 or 76. When the cylinder 38 is actuated in the other direction, the holder 18 is retracted and the caps which are now attached to the bodies, are stripped from the cavities of the die in die holder 18 and the capped bodies remain on the body bar holders from which they may be removed in a simple manner, since they are merely loosely supported thereon.

If desired, in order to move the body bar holders away from the normally stationary die holder 20, the bars 72 connected to the body bar holder 22 may be freely slidable through the die holders 18 and 20. The arrangement may be designed so as to prevent entire withdrawal of the bars 72 from the die holders. In this manner, as the die holder 18 is retracted towards the left, it will eventually engage (in a manner not shown) the ends of bars 72 and retract the body bar holders 22 and 24, so that stripping of the caps from the dies is complete. This stripping action takes place automatically with the embodiment of FIGURE 4, since both dies are simultaneously withdrawn from the body supporting bars 66.

With more particular reference to FIGURE 9, the electrical and pneumatic control system of the device is illustrated. Compressed air is supplied from a compressed air source. A portion of the wall of a compressed air tank 90 is shown together with an outlet conduit 92. Conduit 92 leads to a solenoid controlled valve 94 which is controlled by a switch 96 and which turns the air supply on and off. A power plug 98 is provided and main power lines 100 and 102 are connected thereto, between which a switch 96 is connected. Switch 96 controls the solenoid by means of connecting conductors 104 and 106.

Thus, when switch 96 is closed solenoid 94 is opened and air passes into the valve and then through conduit 108 to a filter 110, a regulator 112, and an oiler 114 to a conduit 116 which supplies the treated, compressed air to a four-way valve 118 which is electrically controlled. Air conduits 120 and 122 are connected to valve 118, one to each end of cylinder 38, so as to control the extension and retraction of piston rod 46.

A pair of toggle switches 124 and 126 are inserted into the electrical line 100, and are spaced from each other by a distance which is more than that which can be spanned by a single hand. Both switches must be thrown over into switching position before the device will operate. Thus, whenever the device is in operation the operator's hands are safely upon switches 124 and 126 and there is no possibility of him accidentally injuring his hands. If it is desired to actuate the piston rod 46 in one direction, then, at the same time that toggle switch 124 is moved to one of its contacts, toggle switch 126 is moved against contact 128. The upper of the two sets of lines entering control valve 118 will then be energized so as to introduce the air pressure from conduit 116 into conduit 120, whereby pressure is exerted on the right side of cylinder 38. If, on the other hand, toggle switch is thrown over to contact 130, then the lower set of electric control lines is operated so that pressurized air from conduit 116 is distributed to conduit 122 and the pressurized air enters the left side of cylinder 38. The control valve is so arranged that when pressure is applied to one of the conduits 120 or 122, an exhaust is also provided to relieve the other end of the cylinder of pressurized air so that the piston may operate therein. However, any suitable type of venting means may be used for this purpose.

It may thus be seen that a simple yet extremely efficient device has been provided which may operate simultaneously upon both ends of a plurality of elongate bodies to cap the ends thereof.

The foregoing is considered only as illustrative of the principles of the invention. Further, since numerous minor modifications and changes will readily occur to those skilled in the art, it is not desired to limit the invention to the exact construction and operation shown and described, and accordingly all suitable modifications and equivalents may be resorted to, falling within the scope of the appended claims.

What is claimed is:

1. A capping device for placing caps on both ends of elongate bodies, comprising:
   means for loosely supporting the intermediate portions of a plurality of such bodies in parallelism in a horizontal plane;
   one piece multiple cavity die means disposed near each end of said supporting means for holding caps for said bodies and arranged so two corresponding cavities of the die means are axially aligned with each body to be supported, each die means having a slot through the top in alignment with each cavity for accommodating caps having leads projecting therefrom; and
   means for moving said die means relatively toward and away from each other with the supporting means therebetween to thereby place caps in said cavities onto each end of the bodies.

2. A capping device for simultaneously placing caps on both ends of bodies, comprising:
   a machine baseplate;
   a pair of parallel guide rails supported above said baseplate and spaced from each other;
   means for loosely supporting the intermediate portions of a plurality of bodies in parallelism in a horizontal plane, said means being freely axially displaceable along said rails;
   a pair of multiple cavity die means mounted on said rails, one on each side of said supporting means, each die means including a plurality of cap nests axially aligned with the supported position of a body and facing said supporting means, each nest being in communication with a straight slot formed through the die means from the top thereof, whereby caps having projecting leads may be accommodated, at least one of said die means being axially movable along said rails; and
   means for moving at least one of said die means toward and away from the other to simultaneously press caps in said nests onto bodies in said supporting means which is interposed between said die means and to remove at least one of said die means from the capper bodies on said supporting means to strip the caps from said nests.

3. A capping device for simultaneously pressing caps on both ends of elongate bodies, comprising:
   a machine frame including a baseplate;
   a pair of spaced support blocks fixed to said baseplate;
   a plurality of spaced parallel guide rails connected between said support blocks;
   a normally stationary die holder mounted for axial movement along said guide rails;
   a pair of backup adjusting screws projecting through one of said support blocks and disposed parallel to said guide rails, said screws being axially adjustable in said one support block to limit movement of said normally stationary die holder toward said on support block;
   a movable die holder mounted for axial movement along said guide rails;
   a cap die mounted on each die holder, each cap die having a plurality of cap accommodating cavities opening toward the other die, each cavity of one die being in axial alignment with a corresponding cavity of the other die;
   body supporting bars mounted for axial movement on said guide rails between said die holders for loosely supporting a plurality of bodies in parallelism in a horizontal plane and in axial alignment with said cavities; and
   means connected to said movable die holder for axially moving it toward and away from said one support block to press caps in said cavities onto the ends of bodies in said bars.

4. A device as defined in claim 3, wherein said dies include slots formed through the upper surfaces thereof and extend to about the middle of each cavity to accommodate a lead projecting from a cap inserted into a cavity.

5. A capping device for simultaneously pressing caps onto both ends of a plurality of elongate bodies, comprising:
   a baseplate;
   a pair of spaced supports on said baseplate;
   a plurality of guide rails connected between said support blocks;
   a pair of multiple cavity dies mounted for axial movement along said rails, said dies having respective axially aligned cavities in their opposing surfaces to accommodate caps therein;
   body supporting means mounted for axial movement on said guide rails and having a plurality of parallel body supporting stations arranged to horizontally support bodies, each in axial alignment with a pair of aligned cavities;
   means for driving said dies toward and away from each other to press caps in said cavities onto both ends of bodies on said supporting means and for stripping the caps from the dies after capping.

6. A capping device as defined in claim 5, wherein each die defines a plurality of slots formed through the upper surface thereof and extending to about the middle of each cavity for accommodating a lead projecting from a cap inserted into a cavity.

7. A capping device for simultaneously pressing caps onto both ends of bodies, comprising:
   means for supporting a plurality of bodies in parallel, said means being freely axially movable;
   a pair of capping dies disposed one on each side of said body supporting means, each die having a plurality of cavities arranged to be in alignment with respective bodies supported by said means so that each body will be axially aligned with two cavities one in each respective die, at least one of said dies being axially movable; and
   means for driving said one die toward and away from the other die so that said dies may move relatively toward and away from each side of said supporting means, whereby caps inserted in said cavities may be simultaneously fit onto both ends of a plurality of bodies on said supporting means.

8. A capping device as defined in claim 7, wherein said cavities are defined in the opposing surfaces of said dies.

9. A capping device as defined in claim 8, wherein a plurality of slots are defined in each die, each extending from substantially the middle of each cavity for accommodating a lead projecting from a cap inserted into a cavity.

10. A capping device as defined in claim 9, wherein said slots and said cavities extend downwardly from the upper surfaces of said dies, whereby caps, even those with projecting leads, may be inserted into said dies from above.

11. A capping device as defined in claim 10, comprising a pair of guide rails on which said supporting means and said dies are mounted.

12. A capping device as defined in claim 11, wherein said supporting means includes a pair of spaced parallel bars having aligned body receiving recesses in the upper surfaces thereof.

13. A capping device as defined in claim 12, wherein said driving means includes a bell crank lever connected to said one die by a link, and a fluid motor connected to the bell-crank lever for controlling movement thereof.

14. A capping device as defined in claim 13, comprising a baseplate, a pair of spaced support blocks on said baseplate and which support said guide rails, a pair of back-up screws adjustably mounted in the support block adjacent the other of said dies for limiting axial movement of said other die in one direction.

15. A device as defined in claim 14, comprising means for controlling operation of said fluid motor, said controlling means including an electric circuit, at least one valve responsive to energization of said circuit to selectively connect a source of pressure fluid to the ends of said motor to move said lever selectively in two directions.

16. A device as defined in claim 15, wherein said controlling means further includes a pair of electric switches spaced a distance apart greater than that which can be spanned by an operator so that the operator must use two hands to energize said circuit.

17. In a capping device for simultaneously pressing caps onto both ends of a body, said device having body supporting means and two capping dies movable relatively toward and away from the supporting means, the improvement wherein said dies have a plurality of parallel and horizontally disposed cavities defined in opposing surfaces thereof with the cavities of one die being aligned with the cavities of the other die, a plurality of slots defined in each die, each extending from substantially the middle of each cavity for accommodating a lead projecting from a cap inserted into a cavity, said slots and said cavities extending downwardly from the upper surfaces of said dies, whereby caps, even those with projecting leads, may be inserted into said dies from above.

References Cited in the file of this patent

UNITED STATES PATENTS

| 2,698,478 | Heisterkamp et al. | Jan. 4, 1955 |
| 3,024,523 | Donaldson | Mar. 13, 1962 |
| 3,029,500 | Aronson et al. | Apr. 17, 1962 |
| 3,031,002 | Miller | Apr. 24, 1962 |
| 3,054,167 | Bryner et al. | Sept. 18, 1962 |

FOREIGN PATENTS

| 378,774 | Great Britain | Aug. 18, 1932 |